United States Patent
Zhao et al.

(10) Patent No.: US 6,497,968 B2
(45) Date of Patent: Dec. 24, 2002

(54) OXIDATION RESISTANT COATINGS FOR MOLYBDENUM SILICIDE-BASED COMPOSITE ARTICLES

(75) Inventors: Ji-Cheng Zhao, Niskayuna, NY (US); Bernard Patrick Bewlay, Schenectady, NY (US); Melvin Robert Jackson, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/793,311

(22) Filed: Feb. 26, 2001

(65) Prior Publication Data

US 2002/0119340 A1 Aug. 29, 2002

(51) Int. Cl.$^7$ .................. B32B 15/04; C22C 30/00; F03B 3/12
(52) U.S. Cl. .................. 428/663; 428/469; 428/446; 428/450; 428/641; 428/660; 428/632; 428/697; 428/699; 428/701; 420/429; 420/578; 420/588; 420/586.1; 106/286.8; 106/286.4; 106/287.1; 106/287.18; 106/287.19; 416/241 R
(58) Field of Search .................. 428/660, 661, 428/663, 621, 632, 469, 446, 697, 450, 699, 702, 641; 420/578, 425, 426, 429, 588, 586.1; 106/287.1, 287.18, 287.19, 1.12, 286.4, 286.8

(56) References Cited

U.S. PATENT DOCUMENTS

| | | | |
|---|---|---|---|
| 5,505,793 A | | 4/1996 | Subramanian et al. |
| 5,582,635 A | * | 12/1996 | Czech et al. |
| 5,595,616 A | | 1/1997 | Berczik |
| 5,683,524 A | | 11/1997 | Subramanian et al. |
| 5,693,156 A | | 12/1997 | Berczik |
| 6,280,857 B1 | * | 8/2001 | Sommer |

\* cited by examiner

Primary Examiner—Deborah Jones
Assistant Examiner—Jennifer McNeil
(74) Attorney, Agent, or Firm—Robert P. Santandrea; Noreen C. Johnson

(57) ABSTRACT

An environmentally resistant coating comprising silicon, titanium, chromium, and a balance of niobium and molybdenum for turbine components formed from molybdenum silicide-based composites. The turbine component may further include a thermal barrier coating disposed upon an outer surface of the environmentally resistant coating comprising zirconia, stabilized zirconia, zircon, mullite, and combinations thereof. The molybdenum silicide-based composite turbine component coated with the environmentally resistant coating and thermal barrier coating is resistant to oxidation at temperatures in the range from about 2000° F. to about 2600° F. and to pesting at temperatures in the range from about 1000° F. to about 1800° F.

58 Claims, 2 Drawing Sheets

OXIDATION RESISTANT COATINGS FOR MOLYBDENUM SILICIDE-BASED COMPOSITE ARTICLES

STATEMENT REGARDING FEDERALLY SPONSORED RESEARCH & DEVELOPMENT

The United States Government may have certain rights in this invention pursuant to Contract No. F33615-98-C-5215, awarded by the United States Air Force, United States Department of Defense.

BACKGROUND OF THE INVENTION

The present invention relates to turbine systems. More particularly, the invention relates to components of such turbine systems. Still more particularly, the invention relates to turbine components formed from a molybdenum silicide-based composite. Finally, the invention relates to environmentally resistant coatings for such turbine components.

Turbine systems, such as, but not limited to, aircraft turbines, land-based, turbines, marine-based turbines, and the like, and their components (hereinafter referred to as "turbine components") have typically been formed from nickel (Ni) based materials, which are often referred to as Ni-based superalloys. Turbine components formed from these Ni-based superalloys exhibit desirable chemical and physical properties under the high temperature, high stress, and high-pressure conditions generally encountered during turbine operation. The highest surface temperatures of state-of-the-art jet engine turbine airfoils, for example, reach as high as about 2100° F. (about 1150° C.), or about 85% of the melting temperature ($T_m$) of most of the Ni-based superalloys.

To date, the Ni-based superalloys have provided the desired level of performance for turbine system applications, causing the development of such Ni-based superalloys to be widely explored. As a result of such extensive study, the field has matured and few significant improvements have been realized in this area in recent years. In the meantime, efforts have been made to develop alternative turbine component materials.

These alternative materials include composite materials (hereinafter generally referred to as "molybdenum silicide-based composites") that are based on molybdenum silicides, such as $MoSi_2$, $Mo_3Si$, $Mo_5Si_3$, and $Mo_5SiB_2$ (T2) Most molybdenum silicide-based composites have melting temperatures of greater than about 3100° F. (about 1700° C.). If molybdenum silicide-based composites can be used at about 80% of their melting temperatures, they will have potential use in applications in which the temperature exceeds the current service temperature limit of Ni-based superalloys.

Molybdenum silicide-based composites comprising molybdenum (Mo), silicon (Si), and either boron (B) or chromium (Cr) are among the materials that have been proposed for turbine component applications in which Ni-based superalloys are presently used. These molybdenum silicide-based composites exhibit a high temperature capability which exceeds that of the Ni-based superalloys that are currently used in such applications. Exemplary molybdenum silicide-based composites are described by Berczik (U.S. Pat. Nos. 5,595,616 and 5,693,156), and Subramanian et al. (U.S. Pat. Nos. 5,505,793 and 5,683,524).

Although the molybdenum silicide-based composites show potential for use as next-generation turbine components having service temperatures that are significantly greater than those of current Ni-based superalloy components, the oxidation of such turbine components remains a concern. At temperatures in the range between about 2000° F. and about 2600° F. (between about 1090° C. and about 1425° C.), refractory materials can undergo rapid oxidation. While a slow-growing oxide scale can form on molybdenum silicide-based composites at this temperature, it is typically not a protective oxide scale. Another type of oxidation known as 'pesting' occurs at intermediate temperatures (e.g., between about 1000° F. and about 1800° F.). Pesting is a phenomenon that is characterized by the disintegration of a material into pieces or powders after exposure to air at intermediate temperatures. Refractory metals, particularly molybdenum, exhibit poor resistance to pesting oxidation.

While significant progress has been made in improving the oxidation performance of molybdenum silicide-based composites, it is desirable to provide coatings for turbine components fabricated from these materials in order to ensure long lifetimes at service temperatures of 2000° F. to 2600° F. Therefore, what is needed is a turbine system that includes components formed from molybdenum silicide-based composites, the components having coatings that will provide increased oxidation resistance at temperatures in the range between about 2000° F. and about 2600° F. What is further needed is a turbine system comprising molybdenum silicide-based composite components having coatings that will provide increased resistance to pesting at temperatures between about 1000° F. an about 1800° F. What is also needed is an environmentally resistant coating for molybdenum silicide-based composites, which will enhance oxidation resistance at high temperatures and pesting resistance at intermediate temperatures.

BRIEF SUMMARY OF THE INVENTION

The present invention meets these needs and others by providing a turbine system that includes molybdenum silicide-based composite components having coatings that increase oxidation resistance at high temperatures and resistance to pesting at intermediate temperatures. The present invention also provides an environmentally resistant coating for molybdenum silicide-based composites that exhibit improved oxidation resistance at high temperatures and resistance to pesting at intermediate temperatures. In addition, methods for making a coated molybdenum silicide-based composite turbine component and coating a molybdenum silicide-based composite are also disclosed.

Accordingly, one aspect of the present invention is to provide a turbine system having at least one turbine component, the component comprising: a molybdenum silicide-based composite substrate, the molybdenum silicide-based composite substrate comprising molybdenum, silicon, and at least one of chromium and boron; and an environmentally resistant coating disposed on a surface of the molybdenum silicide-based composite substrate. The environmentally resistant coating comprises silicon, titanium, chromium, and a balance of niobium and molybdenum.

A second aspect of the invention is to provide an environmentally resistant coating for a molybdenum silicide-based composite substrate. The environmentally resistant coating comprises: between about 43 and 67 atomic percent silicon; between about 2 and about 25 atomic percent titanium; between about 1 and about 25 atomic percent chromium; and a balance of niobium and molybdenum.

A third aspect of the invention is to provide a turbine system having at least one turbine component. The turbine component comprises: a molybdenum silicide-based composite substrate, the molybdenum silicide-based composite substrate comprising molybdenum, silicon, and at least one of chromium and boron; an environmentally resistant coating disposed on a surface of the molybdenum silicide-based composite substrate, the environmentally resistant coating comprising between about 43 and 67 atomic percent silicon, between about 2 and about 25 atomic percent titanium, between about 1 and about 25 atomic percent chromium, and a balance of niobium and molybdenum; and a thermal barrier coating disposed on an outer surface of the environmentally resistant coating.

A fourth aspect of the invention is to provide a method of making a turbine component comprising a molybdenum silicide-based composite and having an environmentally resistant coating, the environmentally resistant coating comprising between about 43 and 67 atomic percent silicon, between about 2 and about 25 atomic percent titanium, between about 1 and about 25 atomic percent chromium, and a balance of niobium and molybdenum. The method comprises the steps of: providing a molybdenum silicide-based composite substrate formed into the turbine component; and depositing the environmentally resistant coating onto the surface of the component.

A fifth aspect of the invention is to provide a method of coating a molybdenum-based substrate with an environmentally resistant coating, the environmentally resistant coating comprising between about 43 and 67 atomic percent silicon, between about 2 and about 25 atomic percent titanium, between about 1 and about 25 atomic percent chromium, and a balance of niobium and molybdenum. The method comprises the steps of: providing a molybdenum silicide-based composite substrate; and depositing the environmentally resistant coating onto the surface of the molybdenum silicide-based composite substrate.

These and other aspects, advantages, and salient features of the invention will become apparent from the following detailed description, the accompanying drawings, and the appended claims.

DETAILED DESCRIPTION OF THE INVENTION

Figure 1:
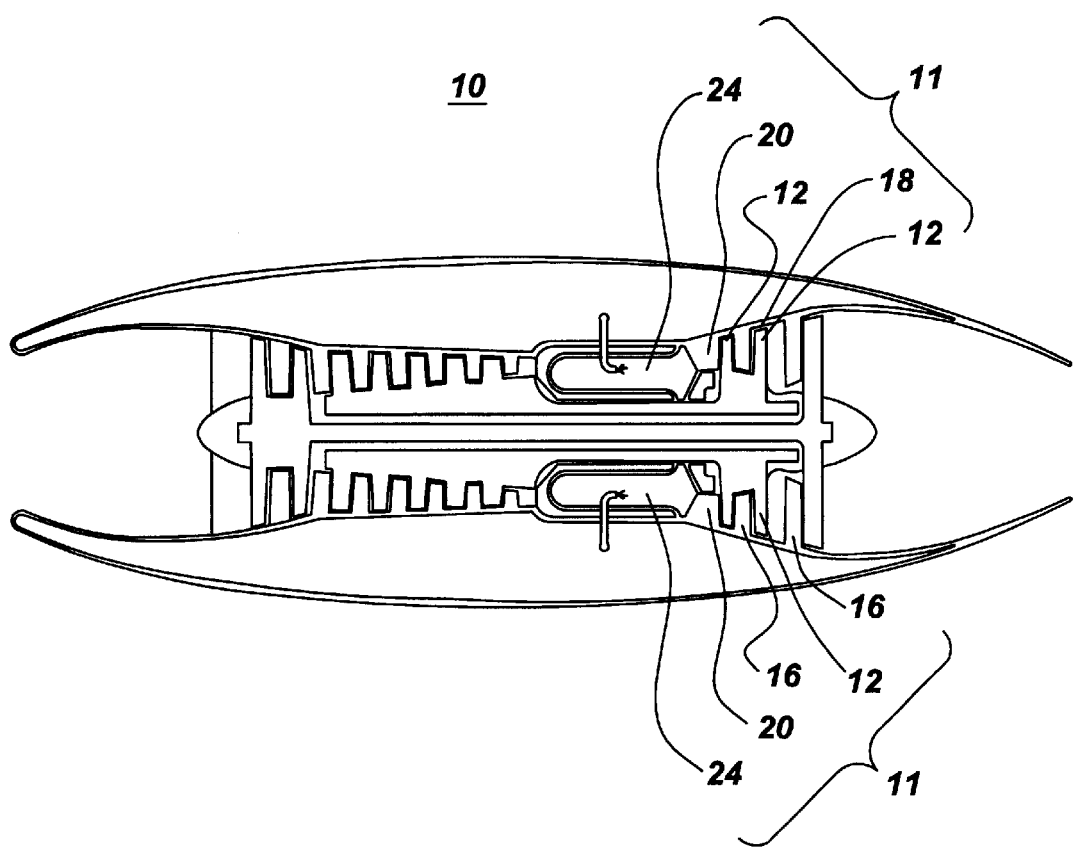
FIG. 1 is a schematic representation of a turbine system.

In the following detailed description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. FIG. 1 is a schematic diagram of a turbine system 10 of the present invention. The turbine system 10 may either be an aircraft engine; a land-based turbine system, such as those widely used for power generation; or a marine-based turbine.

The turbine system 10 of the present invention comprises a number of turbine components 11 that are subject to temperatures of about 2100° F. (about 1150° C.) or greater during normal operation. These turbine components 11 include, but are not limited to: rotating blades 12, static blades 14, vanes 16, shrouds 18, nozzles 20, buckets 22, combustors 24, and the like. Such turbine components 11 are formed from coated molybdenum silicide-based composites and have service temperatures that are either at the limit of or exceed those of similar components formed from nickel-based superalloys that are currently in use.

In the present invention, the molybdenum silicide-based composite that is used to form the turbine components 11 of the turbine system 10 contains at least 10 volume percent of at least one molybdenum silicide and further comprises at least one of boron or chromium. Molybdenum silicides include, but are not limited to, $MoSi_2$, $Mo_3Si$, $Mo_5Si_3$, and $Mo_5SiB_2$ (T2). The molybdenum silicide-based composite preferably comprises between about 2.5 and about 13.5 atomic percent silicon, between about 3.5 and about 26.5 atomic percent boron, and a balance of molybdenum. Alternatively, the molybdenum silicide-based composites may comprise between about 13 and about 16 atomic percent silicon, between about 25 and about 40 atomic percent chromium, and a balance of molybdenum. The molybdenum silicide-based composite may also include other elements, such as, but not limited to, tantalum, titanium, zirconium, rhenium, carbon, hafnium, germanium, tungsten, vanadium, tin, and aluminum.

In the present invention, oxidation of the turbine components 11 formed from molybdenum silicide-based composites is a concern, as such materials can undergo rapid oxidation at temperatures in the range between about 2000° F. and about 2600° F. (between about 1095° C. and about 1425° C.). The slow-growing oxide scale that usually forms on molybdenum silicide-based composites at these temperatures is typically not a protective oxide scale. In addition, another type of oxidation, known as 'pesting,' occurs at intermediate temperatures (e.g., between about 1000° F. an about 1800° F.). Pesting is a phenomenon that is characterized by the disintegration of a material into pieces or powders after exposure at intermediate temperatures. Refractory metals, particularly molybdenum, exhibit poor resistance to pesting oxidation.

Figure 2:
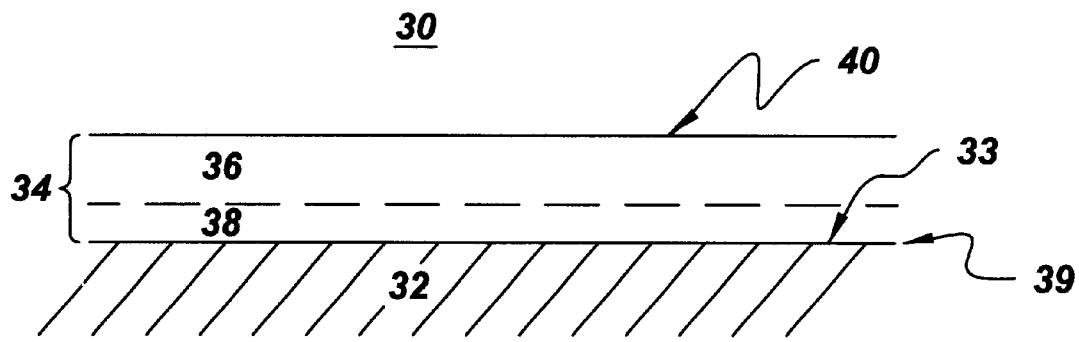
FIG. 2 is a schematic cross-sectional view of an environmentally resistant coating of the present invention deposited on a molybdenum silicide-based composite substrate.

To improve the oxidation and pesting resistance of the turbine components 11 that are formed from molybdenum silicide-based composites, the present invention includes an environmentally resistant coating 34 disposed on a surface 33 of a molybdenum silicide-based composite substrate 32 to form a coated molybdenum silicide-based composite article 30, such as a coated turbine component, as shown in FIG. 2. The environmentally resistant coating 34 has a thickness of between about 10 microns and about 200 microns and comprises silicon, titanium, chromium, and a balance of niobium and molybdenum. It is desirable that the environmentally resistant coating 34 comprise between about 43 and 67 atomic percent silicon; between about 2 and about 25 atomic percent titanium; between about 1 and about 25 atomic percent chromium; and a balance of niobium. The environmentally resistant coating 34 may further comprise at least one metal selected from the group consisting of boron, iron, and tin, wherein the total amount of these elements comprises less than about 5 atomic percent of the environmentally resistant coating. In addition, the environmentally resistant coating 34 may further comprise up to about 20 atomic percent germanium, where germanium replaces silicon. The environmentally resistant coating 34 may also include up to about 3 atomic percent of at least one element selected from the group consisting of hafnium, zirconium, tantalum, rhenium, carbon, aluminum, tin, and tungsten.

The environmentally resistant coating 34 preferably comprises between about 50 and about 67 atomic percent silicon, between about 8 and about 16 atomic percent titanium, between about 4 and about 12 atomic percent chromium, and a balance of niobium and molybdenum. Most preferably, the environmentally resistant coating 34 comprises about 66 atomic percent silicon, about 10 atomic percent titanium, about 5 atomic percent chromium, and a balance of niobium.

The environmentally resistant coating 34 that is formed on the molybdenum silicide-based composite substrate 32 may comprise several different and distinct phases. The phase $Mo_{1-x-y-z}Nb_xTi_yCr_zSi_{2-w}Ge_w$, wherein $1>(x+y+z)\geq 0$ and $2>w\geq 0$, comprises at least about 10 volume percent of the environmentally resistant coating 34. The $Mo_{1-x-y-z}Nb_xTi_yCr_zSi_{2-w}Ge_w$ phase may be concentrated in an outer region 36 adjacent to the outer surface 40 of the environmentally resistant coating 34. Depending on the composition of the molybdenum silicide substrate 32, at least one other phase, such as a $Mo_{5-t-u-v}Nb_tTi_uCr_vSi_{3-s}Ge_s$ phase, a $Mo_{11-p-q-r}Nb_pTi_qCr_rSi_{8-n}Ge_n$ phase, a $Mo_{6-k-l-m}Nb_kTi_lCr_mSi_{5-j}Ge_j$ phase, and a $Mo_{5-g-h-i}Nb_gTi_hCr_iSi_{4-f}Ge_f$ phase, wherein $5>(t+u+v)\geq 0$; $3>s\geq 0$; $11>(p+q+r)\geq 0$; $8>n\geq 0$; $6>(k+l+m)\geq 0$; $5>j\geq 0$; $5>(g+h+i)\geq 0$; and $4>f\geq 0$, may also be present in the environmentally resistant coating 34. These phases may also contain small amounts of chromium and hafnium, and may be concentrated in an interfacial zone 38 adjacent to the interface 39 between the environmentally resistant coating 34 and of the molybdenum silicide-based composite substrate 32.

The environmentally resistant coating 34 may be applied to the molybdenum silicide-based composite substrate 32, such as a turbine component 11, by one of a number of deposition techniques. Preferably, vapor deposition methods, including, but not limited to, ion plasma deposition, vacuum plasma spraying, high velocity oxy-fuel spraying, physical vapor deposition, chemical vapor deposition, and combinations thereof, can be used to deposit niobium, titanium, silicon, and chromium on the surface 33 of the molybdenum silicide-based composite substrate 32. The environmentally resistant coating 34 is then formed by heat treating the molybdenum silicide-based composite substrate 32 at a temperature of at least about 1200° C., preferably for at least about one hour. During the heat treatment at 1200° C., the materials deposited on the surface 33 react with molybdenum in the molybdenum silicide-based composite substrate 32 to form the environmentally resistant layer of the present invention. An additional heat treatment at 1600° C. for 10 hours may be used to further consolidate the environmentally resistant coating 34.

Another technique for applying the environmentally resistant coating 34 to the molybdenum silicide-based composite substrate 32 is to dip the molybdenum silicide-based composite substrate 32 into a slurry comprising a viscous binder containing niobium, titanium, silicon, and chromium. After dipping, the molybdenum silicide-based composite substrate 32 is then heat treated at a temperature of at least about 1200° C., preferably for at least about one hour, to form the environmentally resistant coating 34. During the heat treatment at 1200° C., the slurry reacts with molybdenum in the molybdenum silicide-based composite substrate 32 to form the environmentally resistant layer of the present invention. An additional heat treatment at 1600° C. for 10 hours may be used to consolidate the environmentally resistant coating 34.

Figure 3:
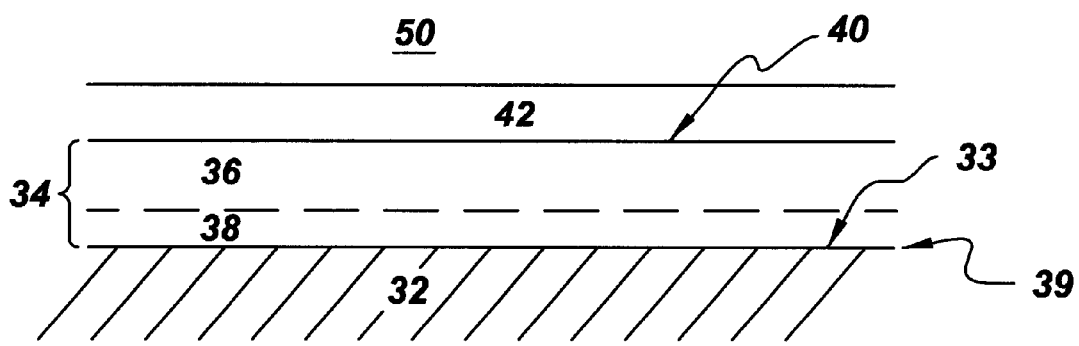
FIG. 3 is a schematic cross-sectional view of a thermal barrier coating and an environmentally resistant coating of the present invention deposited on a molybdenum silicide-based composite substrate.

In addition to the environmentally resistant coating 34, a thermal barrier coating 42 is preferably applied to the molybdenum silicide-based composite substrate 32 to provide a thermal barrier coated molybdenum silicide-based composite article 50, such as a coated turbine component, as shown in FIG. 3. The thermal barrier coating 42 is deposited on the outer surface 40 of the environmentally resistant coating 34. The thermal barrier coating 42 has a thickness of between about 50 microns and about 400 microns, and may comprise: zirconia; zirconia stabilized by the addition of other metal oxides, such as yttria, magnesia, ceria, and the like; zircon, mullite; combinations thereof; or other refractory materials having similar properties. Once the thermal barrier coating 42 and the environmentally resistant coating 34 have been applied to a turbine component 11, the thermal barrier coated turbine component 50 may installed in the turbine system 10.

While various embodiments are described herein, it will be apparent from the specification that various combinations of elements, variations, or improvements thereon may be made by those skilled in the art, and are thus within the scope of the invention. For example, the method of depositing the environmentally resistant coating may include any combination of the various methods described herein. In addition, the thermal barrier coating may comprise other refractory materials other than those described herein. Also, it is contemplated that molybdenum silicide-based composites having the environmentally resistant coating may find use in other applications in which oxidation resistance at high temperature is required.

What is claimed is:

1. A turbine system having at least one turbine component, said turbine component comprising:
    a) a molybdenum silicide-based composite substrate, said molybdenum silicide-based composite substrate comprising molybdenum, silicon, and at least one of boron and chromium; and
    b) an environmentally resistant coating disposed on a surface of said molybdenum silicide-based composite substrate, said environmentally resistant coating comprising: between about 43 atomic percent and 67 atomic percent silicon; between about 2 atomic percent and about 25 atomic percent titanium; between about 1 atomic percent and about 25 atomic percent chromium; and a balance of niobium and, optionally, molybdenum.

2. The turbine system of claim 1, wherein said turbine component further comprises a thermal barrier coating disposed on an outer surface of said environmentally resistant coating.

3. The turbine system of claim 2, wherein said thermal barrier coating comprises at least one material selected from the group consisting of zirconia, stabilized zirconia, zircon, mullite, and combinations thereof.

4. The turbine system of claim 2, wherein said thermal barrier coating has a thickness of between about 50 microns and about 400 microns.

5. The turbine system of claim 4, wherein said turbine component is resistant to oxidation in the range from about 2000° F. to about 2600° F.

6. The turbine system of claim 4, wherein said turbine component is resistant to pesting in the range from about 1000° F. to about 1800° F.

7. The turbine system (10) of claim 1, wherein said environmentally resistant coating (34) comprises between about 50 and about 67 atomic percent silicon, between about 8 and about 16 atomic percent titanium, between about 4 and about 12 atomic percent chromium, and a balance of niobium and, optionally, molybdenum.

8. The turbine system of claim 1, wherein said environmentally resistant coating comprises up to about 20 atomic percent molybdenum.

9. The turbine system of claim 1, wherein said environmentally resistant coating comprises about 66 atomic percent silicon, about 10 atomic percent titanium, about 5 atomic percent chromium, and a balance of niobium.

10. The turbine system of claim 1, wherein said environmentally resistant coating further comprises at least one element selected from the group consisting of boron, tin, and iron, wherein boron, tin, and iron together comprise up to about 5 atomic percent of said environmentally resistant coating.

11. The turbine system of claim 1, wherein said environmentally resistant coating further comprises up to about 20 atomic percent germanium, wherein germanium replaces silicon.

12. The turbine system of claim 11, wherein said environmentally resistant coating comprises up to about 20 atomic percent molybdenum.

13. The turbine system of claim 12, wherein said environmentally resistant coating further comprises up to about 10 atomic percent boron.

14. The turbine system of claim 1, wherein said environmentally resistant coating further comprises up to about 3 atomic percent of at least one element selected from the group consisting of hafnium, zirconium, tin, tantalum, rhenium, carbon, aluminum, and tungsten.

15. The turbine system of claim 1, wherein said environmentally resistant coating has a thickness of between about 10 microns and about 200 microns.

16. The turbine system of claim 1, wherein said turbine component is a component selected from the group consisting of rotating blades, vanes, shrouds, nozzles, and combustors.

17. The turbine system of claim 1, wherein said turbine system is an aircraft turbine system.

18. The turbine system of claim 1, wherein said turbine system is a land-based turbine system.

19. The turbine system of claim 1, wherein said turbine system is a marine turbine system.

20. The turbine system of claim 1, wherein said molybdenum silicide-based composite substrate comprises between about 2.5 and about 13.5 atomic percent silicon, between about 3.5 and about 26.5 atomic percent boron, and a balance of molybdenum.

21. The turbine system of claim 1, wherein said molybdenum silicide-based composite substrate comprises between about 13 and about 16 atomic percent silicon, between about 25 and about 40 atomic percent chromium, and a balance of molybdenum.

22. The turbine system of claim 1, wherein said molybdenum silicide-based composite substrate further comprises at least one element selected from the group consisting of titanium, rhenium, carbon, hafnium, germanium, and aluminum.

23. An environmentally resistant coating for a molybdenum silicide-based composite substrate, said environmentally resistant coating comprising between about 43 and 67 atomic percent silicon; between about 2 and about 25 atomic percent titanium; between about 1 and about 25 atomic percent chromium; and a balance of niobium and, optionally, molybdenum.

24. The environmentally resistant coating of claim 23, further comprising up to about 20 atomic percent germanium, wherein germanium replaces silicon.

25. The environmentally resistant coating of claim 24, further comprising a $Mo_{1-x-y-z}Nb_xTi_yCr_zSi_{2-w}Ge_w$ phase, wherein $1>(x+y+z) \geqq 0$ and $2>w \geqq 0$, and wherein said environmentally resistant coating contains at least 10 volume percent of said $Mo_{1-x-y-z}Nb_xTi_yCr_zSi_{2-w}Ge_w$ phase.

26. The environmentally resistant coating of claim 25, further comprising at least one phase selected from the group consisting of a $Mo_{5-t-u-v}Nb_tTi_uCr_vSi_{3-s}Ge_s$ phase, $Mo_{11-p-q-r}Nb_pTi_qCr_rSi_{8-n}Ge_n$ phase, a $Mo_{6-k-l-m}Nb_kTi_lCr_mSi_{5-j}$ phase, and a $Mo_{5-g-h-i}Nb_gTi_hCr_iSi_{4-f}Ge_f$ phase, wherein $5>(t+u+v) \geqq 0.3 > s \geqq 0$; $11>(p+q+r) \geqq 0$; $8>n \geqq 0$; $6>(k+l+m) \geqq 0$; $5>j \geqq 0$; $5>(g+h+i) \geqq 0$; and $4>f \geqq 0$.

27. The environmentally resistant coating of claim 23, wherein said environmentally resistant coating comprises up to about 20 atomic percent molybdenum.

28. The environmentally resistant coating of claim 23, further comprising up to about 10 atomic percent boron.

29. The environmentally resistant coating of claim 23, wherein said environmentally resistant coating comprises between about 50 and about 67 atomic percent silicon, between about 8 and about 16 atomic percent titanium, between about 4 and about 12 atomic percent chromium, and a balance of niobium and molybdenum.

30. The environmentally resistant coating of claim 29, wherein said environmentally resistant coating comprises about 66 atomic percent silicon, about 10 atomic percent titanium, about 5 atomic percent chromium, and a balance of niobium.

31. The environmentally resistant coating of claim 23, wherein said environmentally resistant coating further comprises at least one element selected from the group consisting of boron, tin, and iron, wherein boron, tin, and iron together comprise up to about 5 atomic percent of said environmentally resistant coating.

32. The environmentally resistant coating of claim 31, wherein said environmentally resistant coating further comprises up to about 3 atomic percent of at least one element selected from the group consisting of hafnium, tantalum, rhenium, carbon, aluminum, and tungsten.

33. The environmentally resistant coating of claim 23, wherein said environmentally resistant coating has a thickness of between about 10 microns and about 200 microns.

34. The environmentally resistant coating of claim 23, wherein said molybdenum silicide-based composite substrate is a turbine component.

35. A turbine system having at least one turbine component, said turbine component comprising:
   a) a molybdenum silicide-based composite substrate, said molybdenum silicide-based composite substrate comprising molybdenum, silicon, and at least one of boron and chromium;
   b) an environmentally resistant coating disposed on a surface of said molybdenum silicide-based composite substrate, said environmentally resistant coating comprising between about 43 and 67 atomic percent silicon; between about 2 and about 25 atomic percent titanium; between about 1 and about 25 atomic percent chromium; and a balance of niobium and, optionally, molybdenum; and
   c) a thermal barrier coating disposed on an outer surface of said environmentally resistant coating.

36. The turbine system of claim 35, wherein said thermal barrier coating comprises at least one material selected from the group consisting of zirconia, stabilized zirconia, zircon, mullite, and combinations thereof.

37. The turbine system of claim 36, wherein said thermal barrier coating has a thickness of between about 50 microns and about 400 microns.

38. The turbine system of claim 37, wherein said turbine component is resistant to oxidation in the range from about 2000° F. to about 2600° F.

39. The turbine system of claim 37, wherein said turbine component is resistant to pesting in the range from about 1000° F. to about 1800° F.

40. The turbine system of claim 35, wherein said environmentally resistant coating comprises between about 50 and about 67 atomic percent silicon, between about 8 and about 16 atomic percent titanium, between about 4 and about 12 atomic percent chromium, and a balance of niobium and molybdenum.

41. The turbine system of claim 40, wherein said environmentally resistant coating comprises about 66 atomic percent silicon, about 10 atomic percent titanium, about 5 atomic percent chromium, and a balance of niobium.

42. The turbine system of claim 35, wherein said environmentally resistant coating comprises up to about 20 atomic percent molybdenum.

43. The turbine system of claim 42, wherein said environmentally resistant coating further comprises up to about 10 atomic percent boron.

44. The turbine system of claim 35, wherein said environmentally resistant coating further comprises at least one element selected from the group consisting of boron, tin, and iron, wherein boron, tin, and iron together comprise up to about 5 atomic percent of said environmentally resistant coating.

45. The turbine system of claim 35, wherein said environmentally resistant coating further comprises up to about 20 atomic percent germanium, wherein germanium replaces silicon.

46. The turbine system of claim 45, wherein said environmentally resistant coating comprises up to about 20 atomic percent molybdenum.

47. The turbine system of claim 46, wherein said environmentally resistant coating further comprises up to about 10 atomic percent boron.

48. The turbine system of claim 45, wherein said environmentally resistant coating further comprises a $Mo_{1-x-y-z}Nb_xTi_yCr_zSi_{2-w}Ge_w$ phase, wherein $1>(x+y+z)\geq 0$ and $2>w\geq 0$, wherein said $Mo_{1-x-y-z}Nb_xTi_yCr_zSi_{2-w}Ge_w$ phase comprises at least 10 volume percent of said environmentally resistant coating.

49. The turbine system of claim 48, wherein said environmentally resistant coating further comprises at least one phase selected from the group consisting of a $Mo_{5-t-u-v}Nb_tTi_uCr_vSi_{3-s}Ge_s$ phase, a $Mo_{11-p-q-r}Nb_pTi_qCr_rSi_{8-n}Ge_n$ phase, a $Mo_{6-k-l-m}Nb_kTi_lCr_mSi_{5-j}Ge_j$ phase, and a $Mo_{5-g-h-i}Nb_gTi_hCr_iSi_{4-f}Ge_f$ phase, wherein $5>(t+u+v)\geq 0$; $3>s\geq 0$; $11>(p+q+r)\geq 0$; $8>n\geq 0$; $6>(k+l+m)\geq 0$; $5>j\geq 0$; $5>(g+h+i)\geq 0$; and $4>f\geq 0$.

50. The turbine system of claim 35, wherein said environmentally resistant coating further comprises up to about 3 atomic percent of at least one element selected from the group consisting of hafnium, tantalum, rhenium, carbon, aluminum, and tungsten.

51. The turbine system of claim 35, wherein said environmentally resistant coating has a thickness of between about 10 microns and about 200 microns.

52. The turbine system of claim 35, wherein said turbine component is a component selected from the group consisting of rotating blades, vanes, shrouds, nozzles, and combustors.

53. The turbine system of claim 35, wherein said turbine system is an aircraft turbine system.

54. The turbine system of claim 35, wherein said turbine system is a land-based turbine system.

55. The turbine system of claim 35, wherein said turbine system is a marine turbine system.

56. The turbine system of claim 35, wherein said molybdenum silicide-based composite substrate comprises between about 2.5 and about 13.5 atomic percent silicon, between about 3.5 and about 26.5 atomic percent boron, and a balance of molybdenum.

57. The turbine system of claim 35, wherein said molybdenum silicide-based composite substrate comprises between about 13 and about 16 atomic percent silicon, between about 25 and about 40 atomic percent chromium, and a balance of molybdenum.

58. The turbine system of claim 35, wherein said molybdenum silicide-based composite substrate further comprises at least one element selected from the group consisting of titanium, zirconium, tin, rhenium, carbon, hafnium, germanium, and aluminum.

* * * * *